United States Patent
Bayer

(10) Patent No.: US 6,483,282 B1
(45) Date of Patent: Nov. 19, 2002

(54) DC/DC CONVERTER

(75) Inventor: Erich Bayer, Thonhausen (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 09/953,467

(22) Filed: Sep. 13, 2001

(30) Foreign Application Priority Data

Oct. 11, 2000 (DE) .......................................... 100 50 496

(51) Int. Cl.$^7$ ................................................. G05F 3/16
(52) U.S. Cl. ...................................... 323/315; 327/536
(58) Field of Search ................................ 323/315, 312, 323/313, 311, 314, 282, 285; 363/59, 60, 62; 327/536, 148

(56) References Cited

U.S. PATENT DOCUMENTS

| | | | |
|---|---|---|---|
| 5,581,454 A | * 12/1996 | Collins .......................... | 363/59 |
| 5,831,469 A | * 11/1998 | Menichelli ................... | 327/536 |
| 6,198,645 B1 | * 3/2001 | Kotowski et al. ............. | 363/59 |

\* cited by examiner

Primary Examiner—Rajnikant B. Patel
(74) Attorney, Agent, or Firm—Bret J. Petersen; W. James Brady; Frederick J. Telecky, Jr.

(57) ABSTRACT

A charge pump-type DC/DC converter comprises n (n≥2) elementary stages, each consisting of a charge pump capacitor and several controllable switches connected thereto, whereby the input voltage of the DC/DC converter is applied to the input of the first stage, both electrodes of the charge pump capacitor of the $k^{th}$ stage are each connectable to one of the controllable switches with the output of the $(k-1)^{th}$ stage, k=2, . . . , n and the output of the $n^{th}$ stage forms the output of the DC/DC converter. The DC/DC converter in accordance with the invention is characterized in that it in addition enables one or more further controllable switches to be connected, via which the electrode of the charge pump capacitor of the $n^{th}$ stage which in the discharge phase is not connected to the output of the converter, to one or more outputs of the $1^{th}$ stage (1=(n−2), . . . 1) and/or of the input voltage, and comprises a control circuit which in the discharge phase of the charge pump cycle signals ON, as a function of the input voltage of the DC/DC converter, that switch of the array consisting of the one controllable switch via which the electrode of the charge pump capacitor of the $n^{th}$ stage can be connected to the output of the $(n-1)^{th}$ stage and the further controllable switches and connects the voltage applied thereto to the cited electrode of the charge pump capacitor of the $n^{th}$ stage at which the efficiency of the DC/DC converter is a maximum.

6 Claims, 4 Drawing Sheets

US 6,483,282 B1

DC/DC CONVERTER

FIELD OF THE INVENTION

The invention relates to charge pump-type DC/DC converters.

BACKGROUND OF THE INVENTION

Many electronic circuits require in addition to the supply voltage further voltages at a level sometimes above that of the supply voltage. One low-cost, simple and more particularly, as compared to coil-type converters, highly compact solution for providing these further voltages are charge pump-type voltage converters. Such converters are described e.g. in the text book "The Art of Electronics" by Paul Horowitz, 2nd Edition, Cambridge University Press, New York 1991 on pages 377 to 379 thereof.

Horowitz also describes a simple charge pump-type DC/DC converter with which an output voltage roughly corresponding to maximally twice the input voltage is achievable. The basic circuit of the converter consists substantially of a capacitor and four controllable switches (e.g. MOSFETs), one electrode of the capacitor being connectable via a first switch to the input voltage terminal of the converter and via a second switch to ground, and the other electrode of the capacitor being connectable via the third switch to the input voltage terminal and via the fourth switch to the output voltage terminal of the converter. The converter comprises in addition a control circuit including a clock signaling the switches so that in a first phase of the clock cycle, the so-called charging phase, the second switch and third switch are ON whilst the other switches are OFF so that the capacitor is charged to the input voltage, and in a second phase of a clock cycle, the so-called discharge phase, the first switch and the fourth switch are ON whilst the other switches are OFF so that now the charged capacitor is connected in series to the input voltage, resulting at the smoothing capacitor located at the output of the circuit in a voltage value roughly corresponding to twice the input voltage. In actual practice the converter is regulated by a regulator mechanism to a predefined fixed output voltage, depending on the concrete requirements of the application concerned, this output voltage being in the range between the input voltage and twice the input voltage.

Since charge pump-type DC/DC converters often need to be accommodated as an IC in small portables, e.g. mobile phones having a (rechargeable) battery power supply, it is good practice to produce for these applications the converters, firstly as small as possible, i.e. taking up minimum circuit area and secondly in minimizing the energy consumption of the converters to save the (rechargeable) battery.

Since the input voltages of the converter as furnished by the (rechargeable) battery very often fall off heavily during the lifetime of the (rechargeable) battery these converters must be able to provide a voltage gain which needs to be sufficient to furnish the portable with the necessary voltage even when the voltages supplied by the (rechargeable) battery is at a minimum useable. When the voltage range to be covered by the power supply is large, cascaded DC/DC converters are put to use preferably in which several elementary stages corresponding in configuration e.g. to the aforementioned charge pump and as described by Horowitz, each comprising a charge pump capacitor and several controllable switches connected in series, whereby the input of the $k^{th}$ stage is connected via one of the controllable switches of the $k-1^{th}$ stage to the output of the $k-1^{th}$ stage. Two stages thus already permit achieving a voltage gain of 4 and three stages a voltage gain of 8. In general the voltage gain of control circuit having N stages can be equated from the formula $2^N$.

Cascaded converters are known from prior art and described e.g. in U.S. Pat. No. 5,635,776.

SUMMARY OF THE INVENTION

One disadvantage of known cascaded DC/DC converters of the aforementioned kind is that the efficiency of the converters is relatively poor, the internal resistance relatively high and the converters permit attaining only a single voltage gain value.

An advantage of an embodiment of the invention is to provide a cascaded DC/DC converter which as compared to existing converters permits achieving a substantially higher efficiency and various voltage gain values.

A further aspect of the invention is to provide a cascaded DC/DC converter whose internal resistance is reduced as compared to that of existing converters.

BRIEF DESCRIPTION OF THE DRAWINGS

The invention will now be detailed by way of example with reference to the drawings in which.

DETAILED DESCRIPTION OF THE EMBODIMENTS

Figure 1:
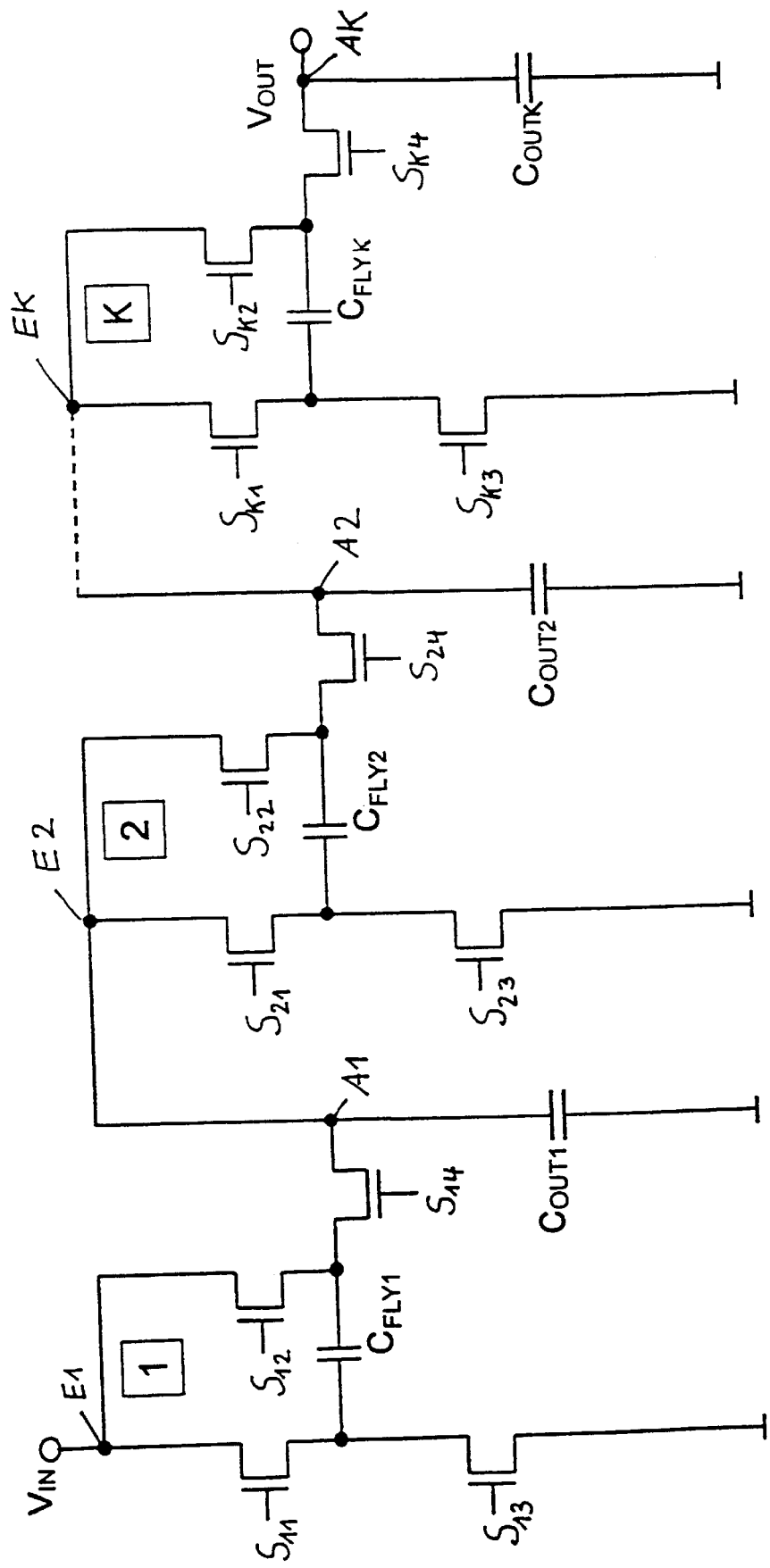
FIG. 1 is a circuit diagram of the charge pump circuit of a known cascaded DC/DC converter including k stages.

Referring now to FIG. 1 there is illustrated a circuit diagram of the charge pump circuit of a known cascaded DC/DC converter including k stages. In this arrangement each of the k stages, only 3 of which are shown, consists of a charge pump capacitor (CFly1, CFly2, ... CFlyK) chargeable in the charging phase of the charge pump cycle via two controllable switches S12, S13; S22, S23; ...; SK2, SK3 connected to the charge pump capacitor which in the charging phase are signaled ON by a control circuit including an oscillator so that the charge pump capacitor (CFly1, CFly2, ... CFlyK) is charged by the voltage applied to the input of the stage (E1, E2, ..., EK) and ground and is charged to a voltage corresponding maximally roughly to the voltage at the input of the stage (E1, E2, ..., EK). In the discharge phase of the charge pump cycle the cited controllable switches S12, S13; S22, S23; ...; SK2, SK3 are signaled OFF by the control circuit including the oscillator, the further controllable switches S11, S14; S21, S24; ...; SK1, SK4 connected to the charge pump capacitor of the individual stages of which being signaled ON by the converters so that now each of the voltages of the individual charge pump capacitors is connected in series to the voltage at the input of the stages, resulting in a voltage at the storage capacitor COUT1, COUT2, ..., COUTK provided at the output of each stage corresponding maximally roughly to twice the voltage at the input of the individual stage.

At the input E1 of the first stage is the input voltage VIN of the circuit. Since each output of a stage (A1, A2, ..., AK)

is connected to the input of the next stage, the voltage generated at the output capacitors COUT1, COUT2, . . . , COUTK is doubled from stage to stage so that the gain of the cascaded DC/DC converter maximally amounts to approx. $2^K$, i.e. the voltage at the output of the converter maximally amounts to approx. VOUT=$2^K$* VIN. The DC/DC converter as shown in FIG. 1 comprises in actual practice a regulator circuit (not shown) which regulates the output voltage VOUT to a design value, it reacting to fluctuations in the load at the output of the converter.

Maximum efficiency (ηMAX) of the known DC/DC converter is given by the following formula:

$$\eta_{\max} = \frac{V_{OUT} \cdot I_{LOAD}}{V_{IN} \cdot I_{IN}} = \frac{V_{OUT}}{V_{IN} * N}, \quad \text{where}$$

VIN=input voltage of the DC/DC converter VOUT=output voltage of the DC/DC converter ILOAD=load current at the output of the converter IIN=input current N=voltage gain factor of the converter.

For a given voltage gain factor N the efficiency ηMAX is defined only by the ratio VOUT to VIN. When in a cascaded converter required to attain a design output voltage VOUT of 3.3 V with two stages (N=4) the input voltage VIN fluctuates e.g. between VINmin=0.9 V and VINmax=1.8 V and the input voltage is on an average VINav=1.2 V the efficiency of the converter is not more than 68.75%.

Figure 2:
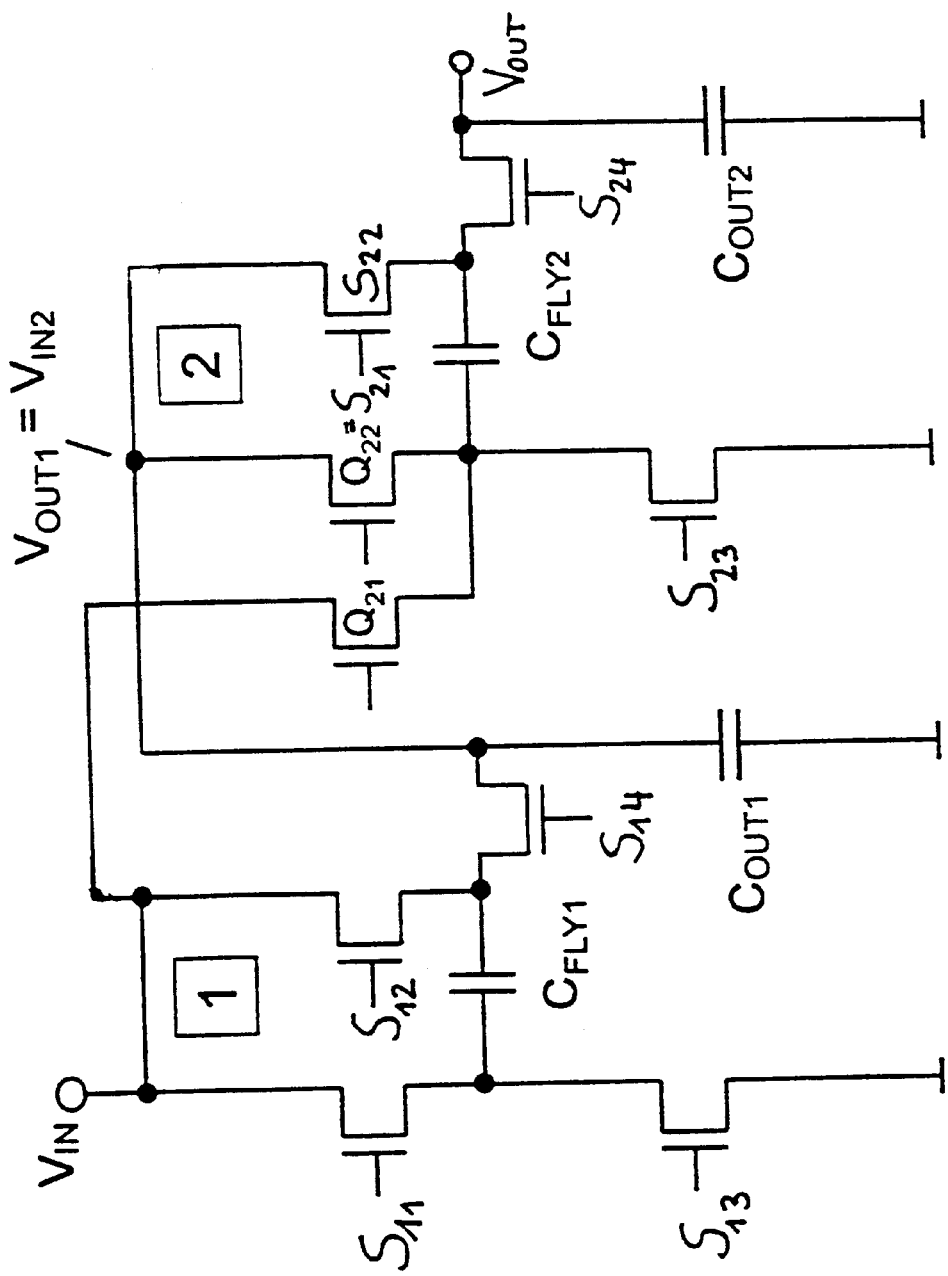
FIG. 2 is a circuit diagram of the charge pump circuit used in a first embodiment of a DC/DC converter in accordance with the invention including two elementary stages.

In the DC/DC converter in accordance with the invention further voltage gain factors N are achievable by adding further controllable switches. Referring now to FIG. 2 there is illustrated the charge pump circuit of a DC/DC converter in accordance with the invention including 2 elementary stages configured as per prior art, except that the charge pump capacitor CFLY2 of the second stage of the converter is now connectable by its one electrode not only via the switch S21 (=Q22) to the output of the first stage but as an alternative also via the further controllable switch Q21 to the input voltage VIN. When now in the discharge phase of the charge pump cycle the switch Q21 is signaled ON and the switch Q22 is signaled OFF, switch S24 as usual being signaled ON and switches S22 and S33 signaled OFF, a voltage VIN+2 VIN is generated at the output capacitor COUT2 so that a voltage gain factor 3 is achievable. Thus in addition to in usual operation in which the controllable switch Q21 is signaled OFF in the discharge phase and the controllable switch Q22 is signaled ON attaining a voltage gain factor of 4, a further voltage gain factor 3 is now available thus making it easier to react to changes in the input voltage VIN of the converter as may be caused e.g. by a battery being discharged (see below for more details), thus improving the efficiency.

Figure 3:
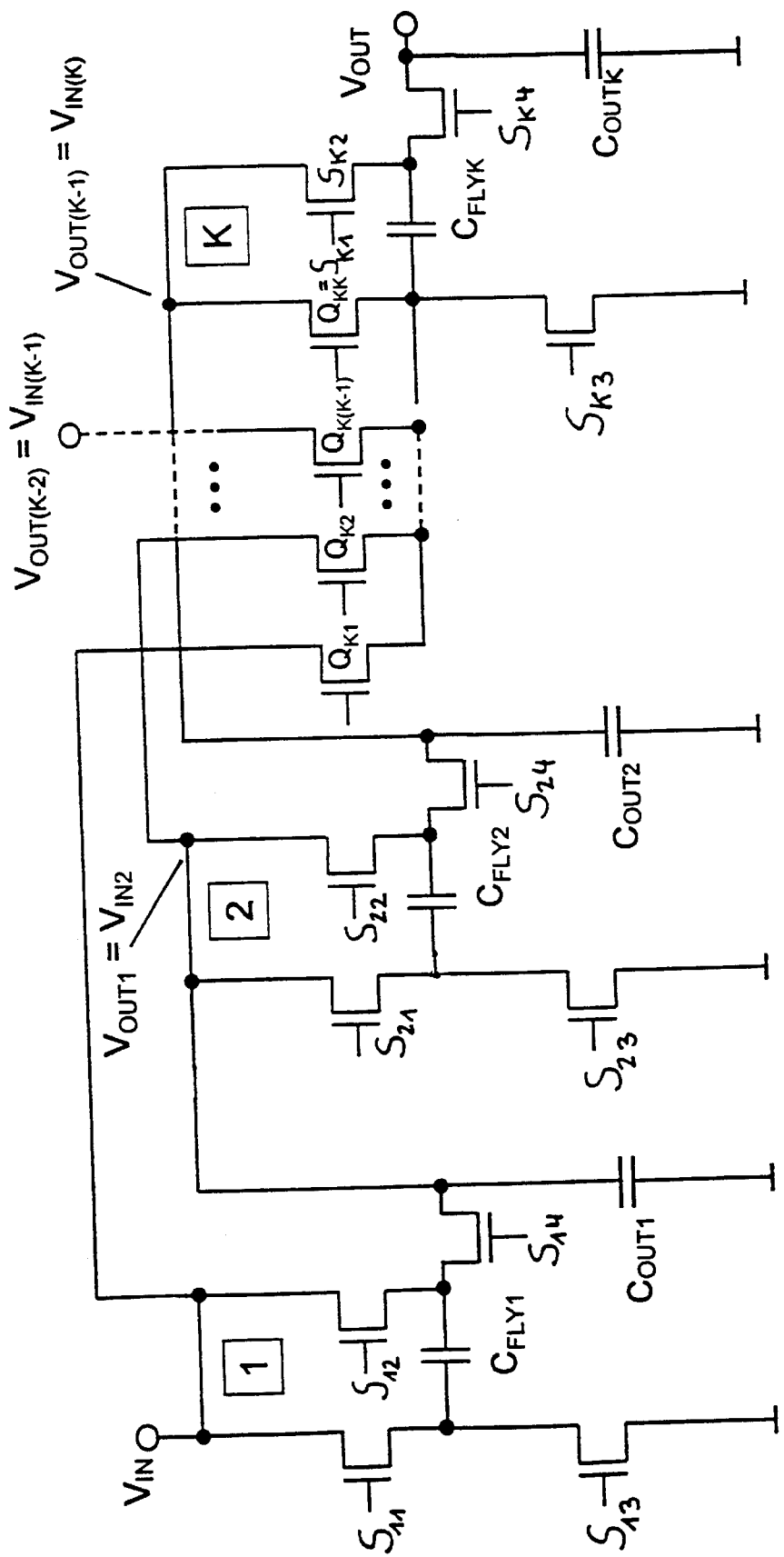
FIG. 3 is a circuit diagram of the charge pump circuit used in a further embodiment of a DC/DC converter in accordance with the invention including k elementary stages.

Referring now to FIG. 3 there is illustrated how this circuit arrangement can be generalized for the case of a cascaded controller having K stages. In this arrangement (K−1) additional controllable switches QK1, QK2, . . . , QK(K−1) are provided via which in the discharge phase of the charge pump cycle the input voltage VIN or the output of each of the stages (K−1) can be connected to the charge pump capacitor so that in addition to the gain factor $2^K$ further K−1 gain factors are achievable, namely the factors $2^{K-1}+2^{K-2}$, $2^{K-1}+2^{K-3}$, $2^{K-1}+2^{K-4}$, . . . , $2^{K-1}+2^{K-K}$.

Thus e.g. for a DC/DC converter having three elementary stages the voltage gain factors 5 and 6 are now achievable in addition to the voltage gain factor 8.

Figure 4:
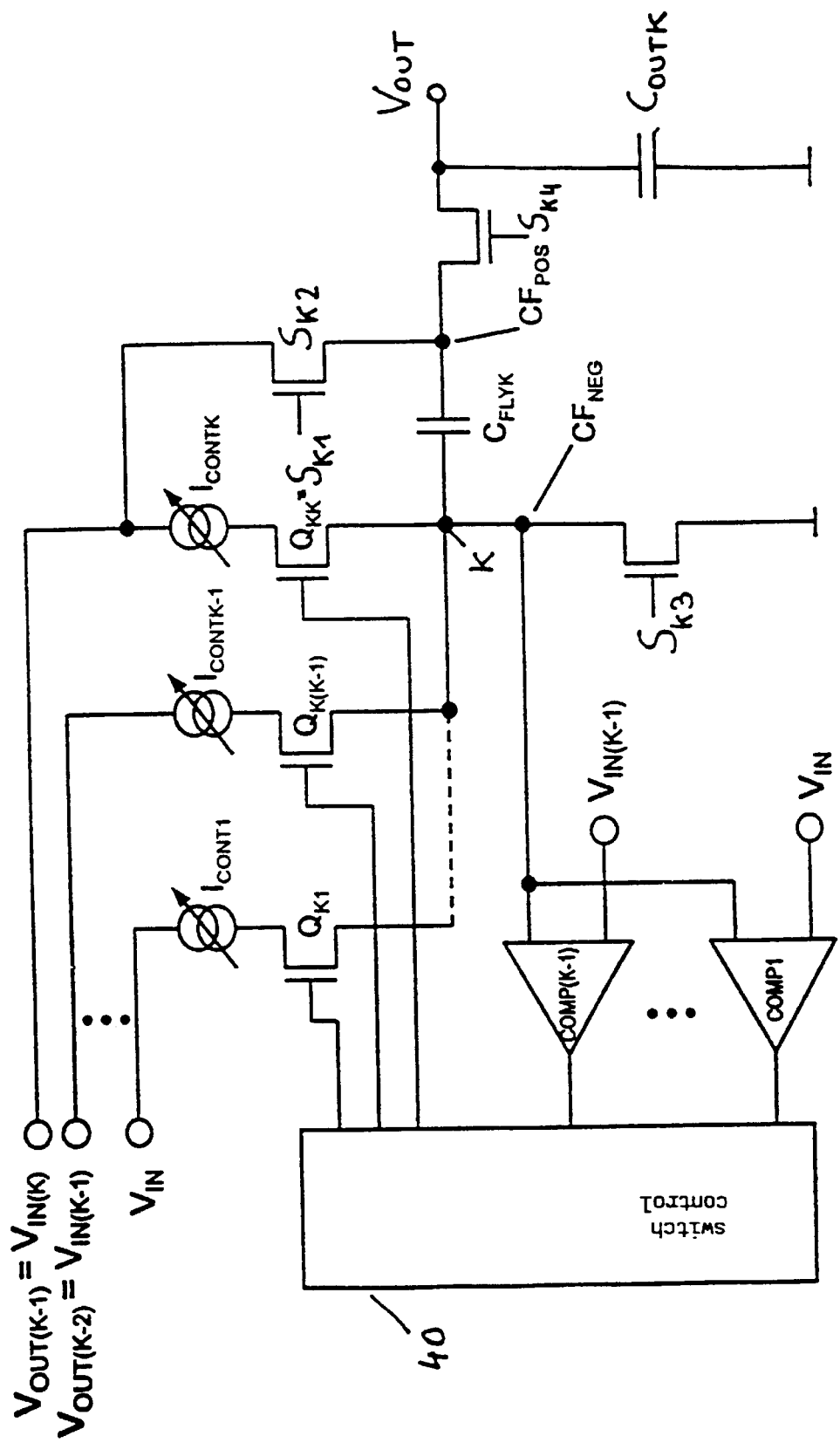
FIG. 4 is a circuit diagram of the control circuit used in the embodiment of a cascaded DC/DC converter in accordance with the invention as shown in FIG. 3.

Referring now to FIG. 4 there is illustrated a control circuit as needed to set the correct voltage gain factor for an optimum efficiency as a function of the input voltage VIN of the DC/DC converter. Shown in FIG. 4 is a control circuit for a cascaded DC/DC converter having K stages. This control circuit as shown in FIG. 4 simultaneously handles regulating the output voltage VOUT of the DC/DC converter.

The output voltage VOUT is regulated by means of a variable current ICONT proportional to the output current IOUT of the DC/DC converter. For this purpose the additional controllable switches QK1, . . . , QK(K−1) as well as the switch QKK are operated as controllable current sources (or controllable resistors) as is symbolized in FIG. 4 by the current sources ICOT1, . . . , ICONTK−1, ICONTK indicated in series with the switches QK1, . . . , QK(K−1), QKK. In this kind of regulation the charge pump capacitor CFLYK of the last stage (stage K) is always charged to a maximum possible value.

In the discharge phase the absolute voltage at the node CFNEG CFNEG as shown in the Figure is now forced to the minimum possible value.

In this arrangement the control circuit of the converter first makes use of the output voltage of the stage K−1 as the "supply voltage" for the stage K in the discharge phase of the charge pump cycle, the node K being connected via the switch QKK (or the current source ICONTK formed thereby) to the voltage VOUT(K−1). A comparator COMP (K−1) checks whether the voltage at the node CFNEG in the discharge phase is smaller than the input voltage VIN(K−1) of the preceding stage (K−1) representing the output voltage of the stage (K−2). If so, as "seen" by a switch control 40 at a corresponding output signal of the comparator, the switch control 40 makes use of the output voltage of the stage K−2 instead of the output voltage of the stage K−1 as the supply voltage for the stage K in the discharge phase of the next charge pump cycle.

This results in the efficiency of the converter being increased since the current furnished by the stage K−2 in the discharge phase is only half as much as would be furnished by the stage K−1. When the converter stage K is operated in this way with the output current from the stage K—1 in the charging phase and with the output current from stage K—2 in the discharge phase the efficiency of the converter is given by the following formula:

$$\eta = \frac{V_{OUT} \cdot I_{LOAD}}{V_{IN} \cdot I_{IN}} = \frac{V_{OUT}}{V_{IN}} \left( \frac{1}{2^{K-1}+2^{K-2}} \right) = \frac{V_{OUT}}{V_{IN} * N_A}$$

Thus, depending on the input voltage VIN of the DC/DC converter and the corresponding load at the output of the DC/DC converter the efficiency can be optimized by selecting the voltage gain factor which is just right at the time.

Shown or indicated in the drawing of FIG. 4 are additional comparators COMP1, . . . , COMP(K−2) which are made use of optionally and with which the voltage at the node CFNEG at the negative electrode of the capacitor can be compared to an optional other input voltage VIN, . . . , VIN(K−1) furnished by preceding stages when, as shown in FIG. 3, further voltage gain factors are desired. The stage K is then supplied with a voltage in the discharge phase which is larger still than the voltage needed at the node CFNEG but best approximating this voltage from all of the voltages available for selection. By successive comparison it is always the voltage at which the efficiency of the converter is an optimum that is applied to the one electrode of the charge pump capacitor CFLYK.

In addition to improving the efficiency the novel DC/DC. converter in accordance with the invention also has a further positive effect in that the internal resistance of the circuit is reduced as is evident from the next two equations.

In a conventional cascaded DC/DC converter (see FIG. 1) having 2 stages (gain: 4) the internal resistance Ri4 totals:

$$R_{i4} = \left(\frac{4}{C_{f1} * f_{clk}} + 8 * \sum_{i=1}^{4} R_{Qi}\right) + \left(\frac{1}{C_{f2} * f_{clk}} + 2 * \sum_{i=5}^{8} R_{Qi}\right), \quad \text{where}$$

Cf=capacitance of the charge pump capacitor fclk=clock frequency RQi=ON resistance of the controllable switches When operating the cascaded DC/DC converter in accordance with the invention having 2 stages with the "new" gain factor 3 the internal resistance is reduced in accordance with the following formula:

$$R_{i3} = \left(\frac{1}{C_{f1} * F_{clk}} + 2 * \sum_{i=1}^{4} R_{Qi}\right) + \left(\frac{1}{C_{f2} * f_{clk}} + 2 * \sum_{i=6}^{9} R_{Qi}\right)$$

In conclusion it is to be noted that the converter can, of course, be operated without the output capacitors of the individual stages and only with a single output capacitor at the output of the DC/DC converter circuit when desired. Operating a cascaded DC/DC converter with only a single output capacitor is known from prior art and described e.g. in the aforementioned U.S. Pat. No. 5,635,776.

The gist in accordance with the invention may, of course, also be realized by connecting the other electrode of the charge pump capacitor of the last stage (n) of the converter to one or more of the outputs of the n–2, . . . , 1 or of the input voltage so that now in the charging phase and not in the discharge phase, as described above, the voltage is applied to the charge pump capacitor of the last converter stage at which the efficiency is an optimum. The person skilled in the art will appreciate from the above description how the control circuit as shown in FIG. 4 is to be configured in this case.

What is claimed is:

1. A charge pump-type DC/DC converter regulated to a predefined output voltage and comprising n (n≧2) elementary stages each consisting of a charge pump capacitor and several controllable switches connected thereto via which the charge pump capacitor is connectable either parallel to the input voltage of the corresponding elementary stage so that it can be charged in the charging phase of a charge pump cycle maximally roughly to the input voltage of the corresponding stage or connected in series to the input voltage of the corresponding stage so that in the discharge phase of a charge pump cycle at the output of a the corresponding stage a voltage can be generated corresponding maximally roughly to twice the input voltage of the stage, whereby the input voltage of the DC/DC converter is applied to the input of the first stage, both electrodes of the charge pump capacitor of the $k^{th}$ stage are connectable via one of the controllable switches to the output of the $(k-1)^{th}$ stage, k=2, . . . , n and the output of the $n^{th}$ stage forms the output of the DC/DC converter, characterized in that it in addition comprises one or more further controllable switches via which the electrode of the charge pump capacitor of the $n^{th}$ stage, which in the discharge phase is not connected to the output of the converter, is connectable to one or more outputs of the $1^{th}$ stage (1=(n–2), . . . 1) and/or of the input voltage, and a control circuit which in the discharge phase of the charge pump cycle signals ON, as a function of the input voltage of the DC/DC converter, that switch of the array consisting of the one controllable switch via which the electrode of the charge pump capacitor of the $n^{th}$ stage can be connected to the output of the $(n-1)^{th}$ stage and the further controllable switches and connects the voltage applied thereto to the cited electrode of the charge pump capacitor of the $n^{th}$ stage at which the efficiency of the DC/DC converter is a maximum.

2. The DC/DC converter as set forth in claim 1 wherein a storage capacitor is provided at each output of every stage.

3. The DC/DC converter as set forth in claim 1 wherein the number of the several further controllable switches is n–1 so that the cited electrode of the charge pump capacitor of the $n^{th}$ stage can be connected to the output of each preceding stage or with the input voltage.

4. The DC/DC converter as set forth in claim 1 wherein each of the switches of the array of switches consists of a controllable current source or a controllable resistor via which the output voltage of the DC/DC converter can be linearly regulated.

5. The DC/DC converter as set forth in claim 4 wherein the control circuit comprises one or more comparators, one of which compares the output voltage of a stage in the discharge phase of the charge pump cycle at the electrode of the charge pump capacitor of the $n^{th}$ stage not connected to the output of the converter in the discharge phase to the output voltage of a stage preceding the stage whose output voltage is just connected to this electrode of the charge pump capacitor in the discharge phase and then, when this voltage in the discharge phase is smaller than the output voltage of the preceding stage, outputs a control signal to the control circuit which then in the discharge phase of the subsequent charge pump cycle connects this electrode of the charge pump capacitor to the output voltage of the preceding stage, whereby this comparison in the case of several comparators is implemented analogously with the aid of the further comparators successively until a stage is attained in which the efficiency of the converter is an optimum.

6. A charge pump-type DC/DC converter regulated to a predefined output voltage and comprising n (n≧2) elementary stages, each consisting of a charge pump capacitor and several controllable switches connected thereto via which the charge pump capacitor is connectable either parallel to the input voltage of the corresponding elementary stage so that it can be charged in the charging phase of a charge pump cycle maximally roughly to the input voltage of the corresponding stage or connected in series to the input voltage of the corresponding stage so that in the discharge phase of a charge pump cycle at the output of the corresponding stage a voltage can be generated corresponding maximally roughly to twice the input voltage of the stage, whereby the input voltage of the DC/DC converter is applied to the input of the first stage, both electrodes of the charge pump capacitor of the $k^{th}$ stage are each connected via one of the controllable switches to the output of the $(k-1)^{th}$ stage, k=2, . . . , n and the output of the nth stage forms the output of the DC/DC converter, characterized in that it in addition comprises one or more further controllable switches via which the one electrode of the charge pump capacitor of the $n^{th}$ stage which in the discharge phase is connected to the output of the converter, is connectable in the charging phase of the charge pump cycle to one or more outputs of the $1^{th}$ stage (1=(n–2), . . . 1) and/or of the input voltage, and a control circuit which in the charging phase of the charge pump cycle signals ON, as a function of the input voltage of the DC/DC converter, that switch of the array consisting of the one controllable switch via which the electrode of the charge pump capacitor of the $n^{th}$ stage can be connected to the output of the $(n-1)^{th}$ stage in the charging phase and the further controllable switches and connects the voltage applied thereto to the cited electrode of the charge pump capacitor of the $n^{th}$ stage at which the efficiency of the DC/DC converter is a maximum.

* * * * *